United States Patent

[11] 3,593,327

[72] Inventor Karl E. Shill
Fremont, Calif.

[21] Appl. No. 770,231
[22] Filed Oct. 24, 1968
[45] Patented July 13, 1971
[73] Assignee The Singer Company

[54] MEMORY-DISC CARTRIDGE WITH LOADING MECHANISM
4 Claims, 12 Drawing Figs.

[52] U.S. Cl. .......... 340/174.1
C, 179/100.2 Z
[51] Int. Cl. .......... G11b 23/04
[50] Field of Search .......... 340/174.1
C; 179/100.2 Z; 274/4, 41.4

[56] References Cited

UNITED STATES PATENTS

| | | | |
|---|---|---|---|
| 3,206,214 | 9/1965 | Leary .......... | 340/174.1 |
| 3,304,544 | 2/1967 | Johnson et al. .......... | 340/174.1 |
| 3,416,150 | 12/1968 | Lindberg, Jr. .......... | 340/174.1 |
| 3,445,116 | 5/1969 | Knox .......... | 179/100.2 |
| 3,273,815 | 9/1966 | Schuller .......... | 179/100.2 |
| 3,487,390 | 12/1969 | Klinger et al. .......... | 340/174.1 |

*Primary Examiner*—Bernard Konick
*Assistant Examiner*—Vincent P. Canney
*Attorney*—Charles R. Lepchinsky

ABSTRACT: A magnetic disc cartridge is insertable through a slot into a drive housing. Such insertion opens a shutter in the cartridge and unlocks a lowering mechanism. Closing of a door to the slot lowers the cartridge to set the memory disc onto a drive spindle where it is held magnetically. Operation of the drive mechanism then locks the door closed and locks the cartridge down.

INVENTOR.
Karl E. Shill
BY Karl H. Sommermeyer
ATTORNEY

MEMORY-DISC CARTRIDGE WITH LOADING MECHANISM

BACKGROUND OF THE INVENTION

1. Field of the Invention

The present invention relates to cartridges for interchangeable, magnetic, data-storage discs, and to systems for using such discs in cartridges.

2. Description of the Prior Art

It is known, as shown in U.S. Pat. No. 3,304,544 to mount a magnetic record disc in a cartridgelike case, to support the disc therein on a hub mounted for rotation on a bearing in the case and provide for rotative coupling to the hub, and to let the transducer and its supporting arm intrusively project into the case as the case in manually pushed into place on the drive machine.

SUMMARY OF THE INVENTION

Such prior construction supports the disc on the case and so requires close tolerances in the construction of the case, and precise manual positioning of it on the drive machine. Precise handling by an operator is required also for avoiding any damaging contacts between the disc and transducer head as the cartridge is set into place.

In accordance with my invention, a magnetic record disc is carried loose in a cartridge case and is arranged to directly engage, and be supported for operation on, the drive spindle of the machine. The manual insertion of the cartridge opens a shutter, but keeps the record disc out of any dangerous proximity to either the drive spindle or transducer head. Only when the cartridge has been completely inserted so that its path of further movement is controlled by the machine rather than by the operator, can it be moved to carry the disc into operating relationship with those elements.

BRIEF DESCRIPTION OF THE DRAWINGS

These and other objects and advantages of the invention will be apparent from the following description of a specific embodiment, taken in connection with the accompanying drawings, wherein.

DESCRIPTION OF THE PREFERRED EMBODIMENT

Figure 1:
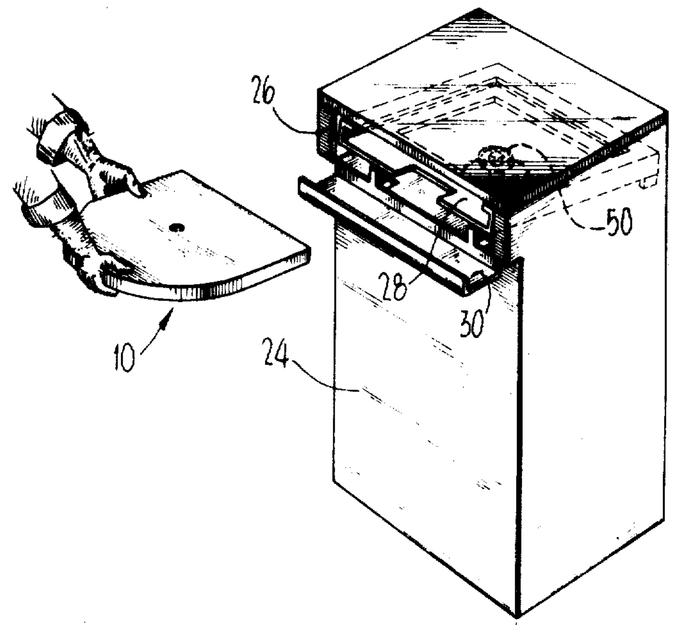
FIG. 1 is a general pictorial view of a record-disc cartridge and of a disc-drive housing with some of the parts detailed that cooperate with, and receive, the cartridge.
Figure 2:
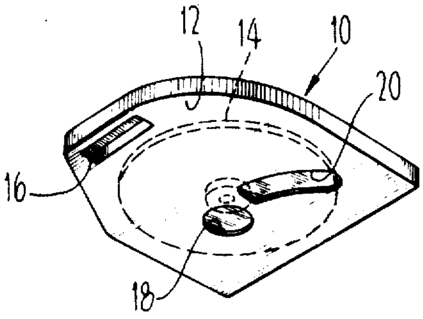
FIG. 2 is a pictorial view showing the lower side of the disc cartridge.

In FIGS. 1 and 2 there is shown a cartridge 10 which includes a housing 12 and also a magnetic record disc 14 indicated in dotted lines. The underface of the housing includes an opening 16 for a handgrip, an opening 18 through which a drive spindle may engage the disc 14, and an elongated slot, or opening, 20 through which a magnetic transducer may have access to the disc 14.

In FIG. 1, a drive unit for the magnetic disc includes a housing 24 having a front slot, or opening, 26 for the reception of a cartridge such as the cartridge 10, a frame 28 aligned with the opening 26 for receiving the cartridge, and a door 30 hinged at 31 for closing the opening. Frame 28 has channel-shaped sides and rear for embracing the edges of the cartridge 10, and is open in the center to stay clear of the openings 18 and 20 of the cartridge.

Figure 3:
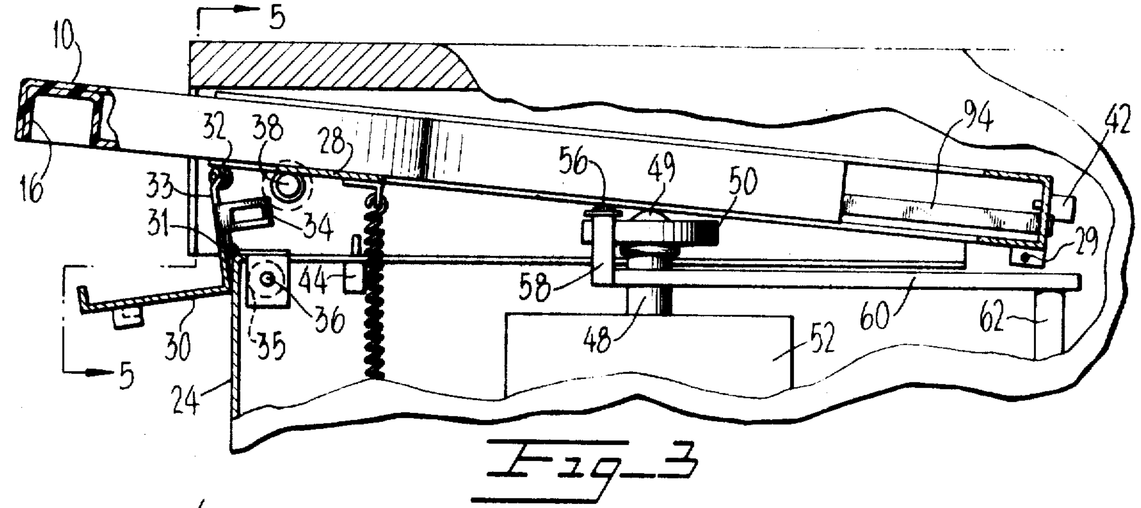
FIG. 3 is a partial, right side, sectional elevation showing the disc cartridge partially inserted in the drive housing.

FIG. 3 shows a cartridge 10 partially inserted in the frame 28. The frame is hinged at 29 near its rear edge, or right edge as seen in FIG. 3. The front end of frame 28 is arranged to be lifted into the upper position, shown in FIG. 3, by rollers 32 carried on extensions 33 of the door 30, when the door 30 is moved to its open position, as shown. When closed, the door 30 may be held by a solenoid-controlled latch which includes a bracket 34 on a door extension 33, FIGS. 3, 4 and 6, and a solenoid 35, having a plunger 36 that extends to engage bracket 34. The plunger 37 has an angled face 37 to permit the door 30 to be closed and latched when the solenoid is deenergized. The door 30 can be opened only when solenoid 39 is energized.

Figure 5:
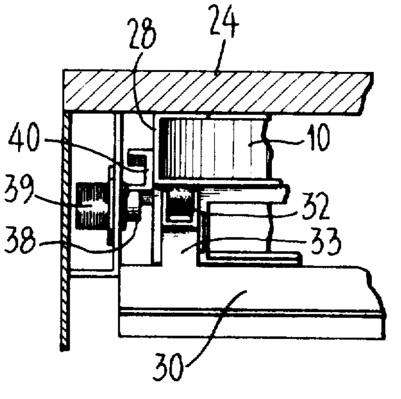
FIG. 5 is a partial, front, elevational section taken substantially on the offset line 5–5 of FIG. 3, showing the cartridge frame held in its upper position by the magnetically operated latch.

The frame 28 is locked in this upper position of FIG. 3 by a plunger 38 of a solenoid 39, which is also shown in FIG. 5, and which, when the solenoid is deenergized, lies under a U-shaped bracket 40 attached to the side of the frame 28.

Figure 4:
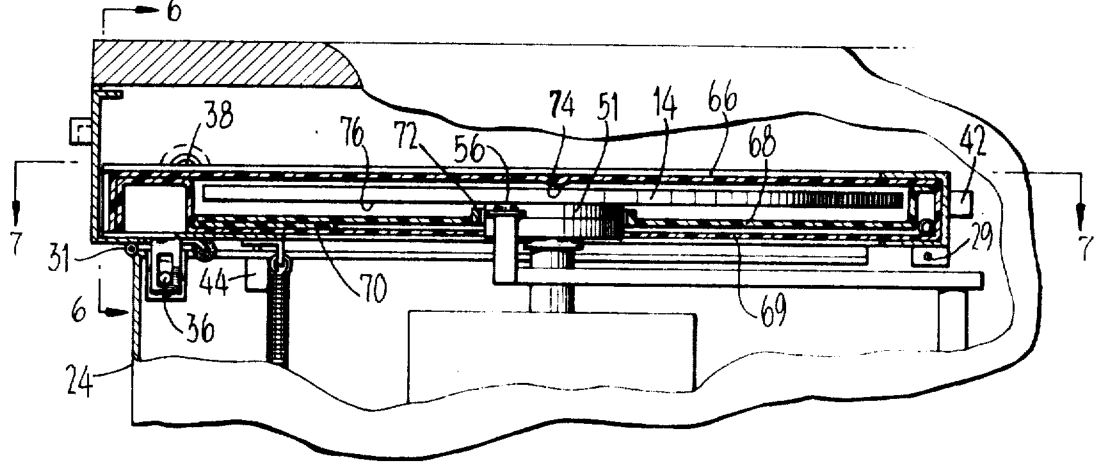
FIG. 4 is a sectional elevation similar to FIG. 3, but showing the door of the housing closed and the cartridge lowered to put the disc in operative position.
Figure 6:
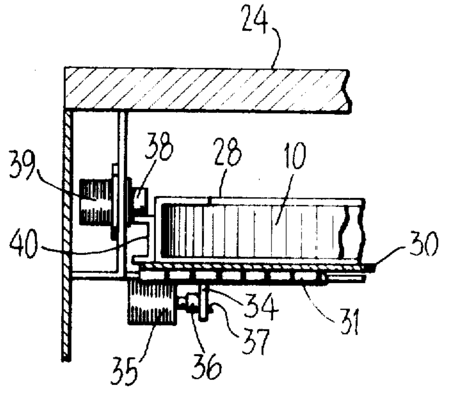
FIG. 6 is a similar section taken substantially along the line 6–6 of FIG. 4, showing the cartridge frame latched in its lowered, or operating, position.

When the solenoid 39 is energized for retracting the plunger 38, the frame 28 may be lowered by closing the door 30, as seen in FIG. 4, and in this lowered position of the frame 28, the solenoid plunger 38, when the solenoid is deenergized, may lie over the bracket 40 for latching the frame 28 in this lowered position, as shown in FIG. 6. The door 30 may be closed and latched by the solenoid plunger 36, FIG. 6, even though the frame 28 is locked in its upper position by solenoid plunger 38, FIG. 5.

A switch 42 at the back of the channel 28 is actuated when the cartridge 10 is fully inserted in the frame, and a switch 44 supported on housing 24 is actuated when the frame 28 is moved to its lower position, shown in FIGS. 4 and 6.

Figure 11:
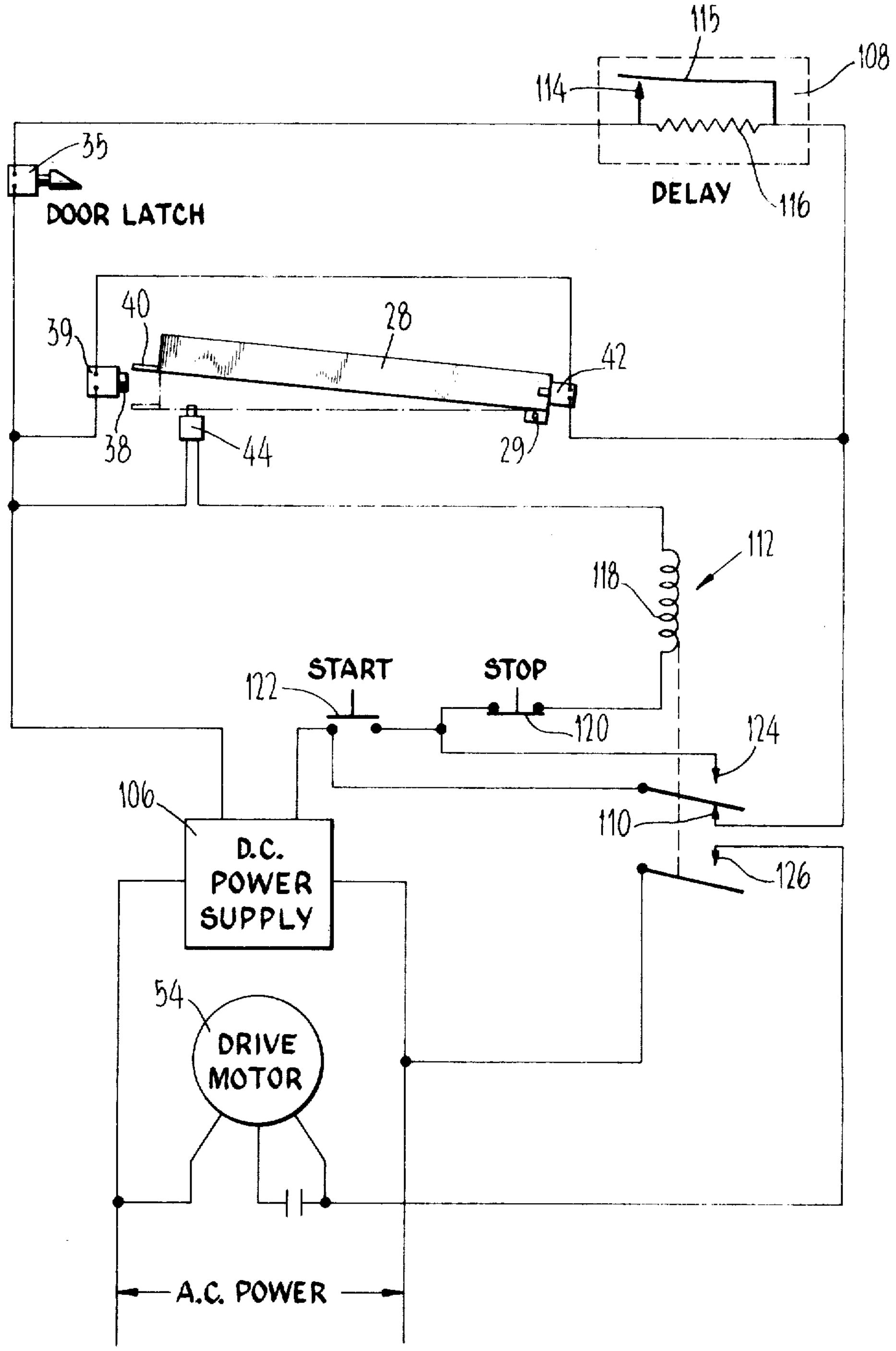
FIG. 11 is a schematic circuit diagram of the electric controls.

The drive unit includes a spindle 48, FIG. 3, carried in a bearing structure 52 and driven by an electric motor, which is shown only at 54 in the electrical schematic diagram of FIG. 11. Spindle 48 carries a magnetic chuck 50, FIG. 12, which includes a seat 46, pole pieces 47 and permanent magnets 45. Record disc 14 has glued to it a magnetic pad 51, FIG. 12, of iron or steel that mates with the seat 46 and is attracted by the magnets 45. A central recess 53 in the pad 51 fits a conical top 49 of the shaft 48 for centering the disc 14 as it is lowered onto the drive unit. A magnetic transducer 56, FIG. 3, is carried on a bracket 58, on an arm 60 that swings about a post 62. When the frame 28 is in its upper position, to which it is lifted by the rollers 34, FIG. 3, and at which it is held by the solenoid plunger 38, FIG. 5, it holds the cartridge 10 above, and clear of, the spindle 48 and transducer 56. Then, when the frame 28 is lowered as in FIG. 4, it lowers the cartridge 10, sets the pad 51, FIG. 12, of the magnetic record disc 14 therein onto the cone 49 of spindle 48 and the seat 46 of chuck 50, and so places the disc 14 in operative position with respect to the transducer 56, FIG. 4.

Figure 10:
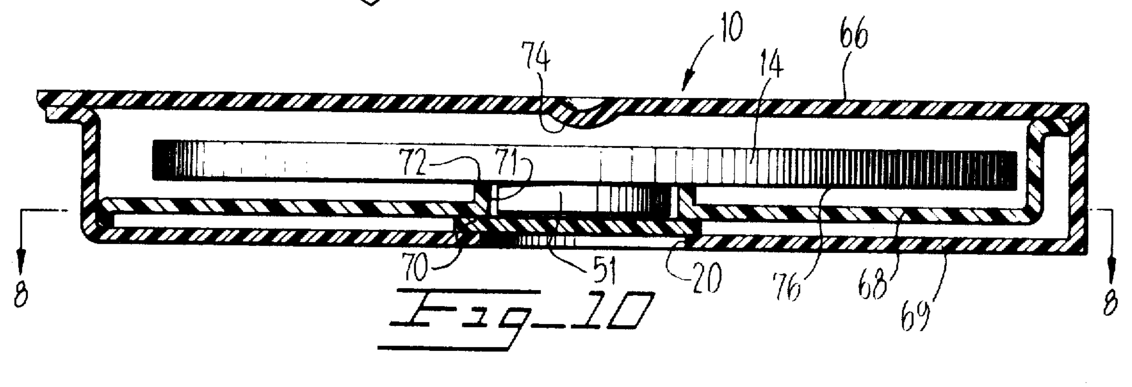
FIG. 10 is a partial elevational section of the disc cartridge taken substantially along the line 10–10 of FIG. 8 with some dimensions exaggerated for facilitating the showing.

As shown in the sectional view of FIG. 4 and also in the partial section of FIG. 10, where some dimensions are exaggerated, the cartridge housing 12 includes a top wall, or panel, 66 and also a double shutter consisting of the two panels 68 and 69. A shutter 70 lies between the two panels 68 and 69 for closing the openings 18 and 20, FIG. 2. The magnetic record disc 14 lies within the space between the walls 66 and 68 and is supported, when the cartridge is out of the machine as in FIG. 10, on an upward-extending ring 72 concentric with the hole 71 in panel 68. This ring 72 encircles the pad 51 (see also FIG. 12) on the disc 14 and engages the disc 14 on a nonrecord area. A dimple, or extension 74, in the top panel 66 limits the upward freedom of the disc 14 to keep the pad 51 within the ring 72.

Figures 7, 12:
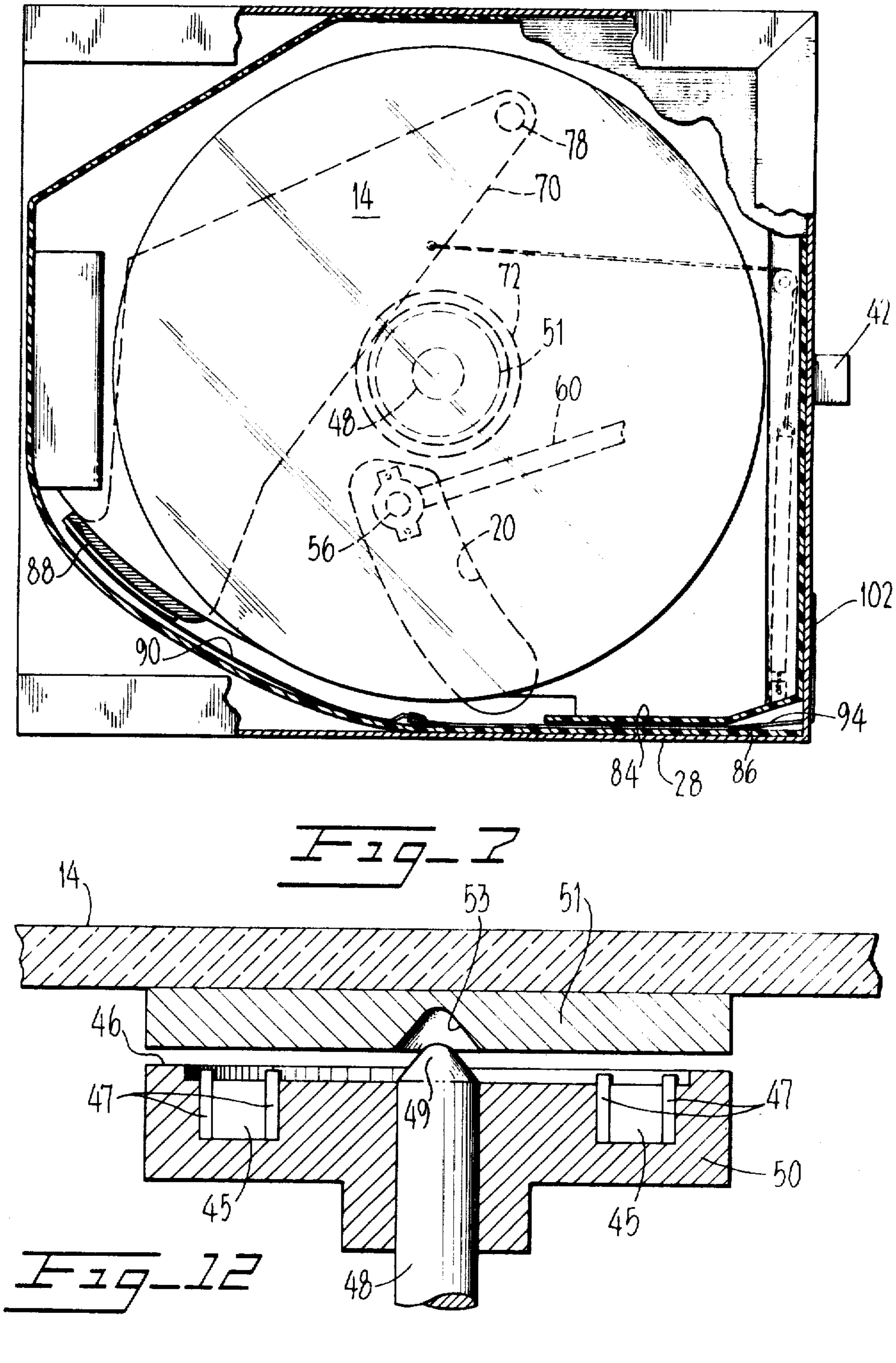
FIG. 7 is a section in plan taken substantially along the line 7–7 of FIG. 4 for showing some of the detail of the disc and its casing, and for showing also the cooperation of the cartridge with the cartridge-receiving frame in the drive housing.
FIG. 12 is a partial elevational sectional detail showing the magnets for holding the record disc on the drive spindle.

The recording disc 14 may be formed of a glass plate having a coating of magnetic metal or oxide on its lower surface 76, FIGS. 4 and 12. The panels 66, 68 and 69 and the shutter 70 may be constructed of transparent methyl methacrylite. The ring 72 and dimple 74, FIG. 12, confine the recording disc 14 loosely to permit large tolerances in the construction of the cartridge housing 12 itself and in the positioning of the cartridge 10 in the machine, while still permitting a precise location of the disc 14 with respect to the drive spindle 48 and permitting also free turning of the disc 14 in the cartridge housing 12 in the operating position, shown, for example, in FIG. 4.

Figure 8:
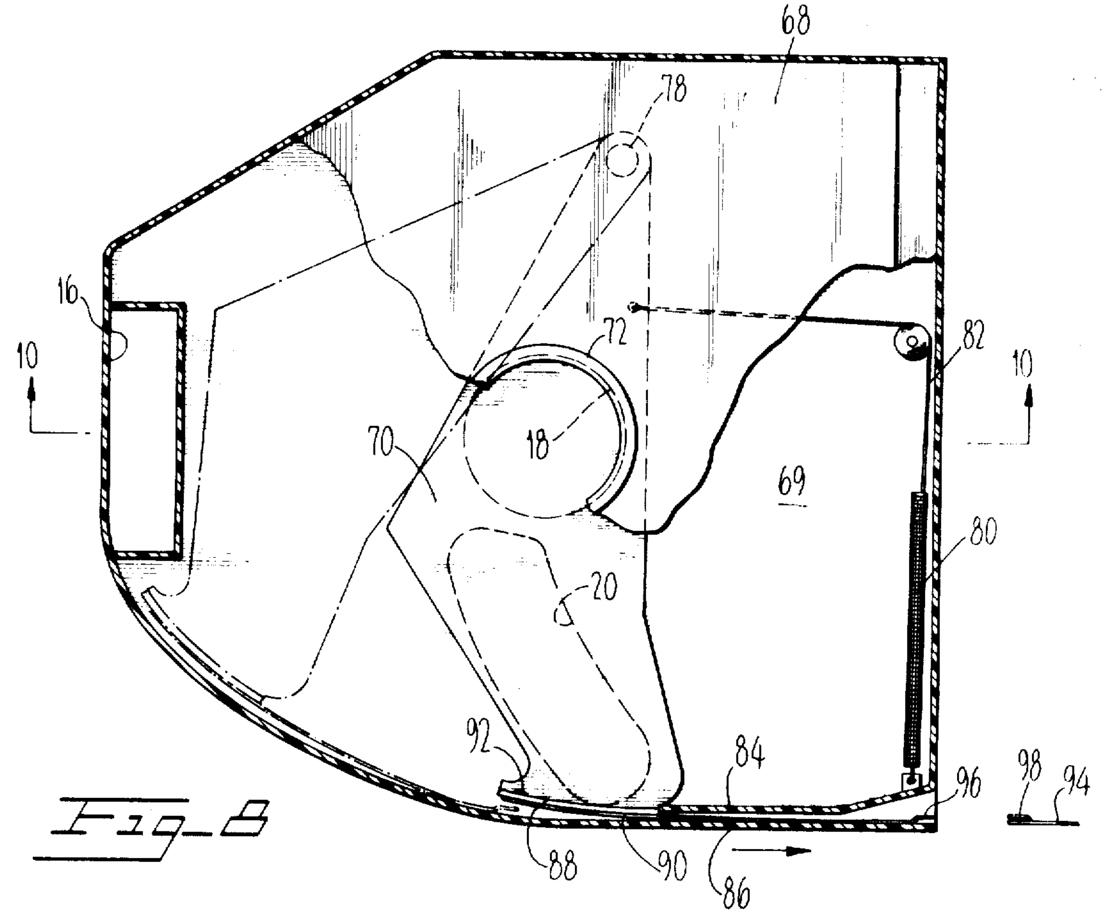
FIG. 8 is a sectional plan view of the cartridge taken below the recording disc, showing the upper panel of the double bottom partly broken away, and showing the shutter in its closed position as when the cartridge is outside the drive housing. It is approximately a section along the offset line 8–8 of FIG. 10.

The shutter 70, which lies between the two parts 68 and 69 of the double bottom, FIG. 10, is journaled on a pin 78, FIG. 8, and is biased to closed position, as shown in FIG. 8, by a tension spring 80, which is connected to the shutter 70 by a flexible wire 82. In this closed position, the shutter covers the two openings 18 and 20.

Figure 9:
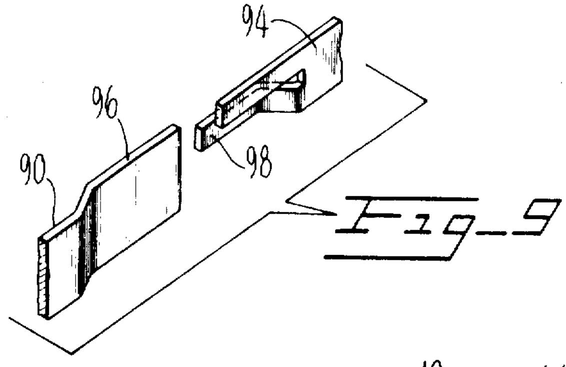
FIG. 9 is a partial view of a detail of the shutter actuating mechanism.

The cartridge housing 12 includes an internal partition 84, FIG. 8, which extends along, and lies close to, a sidewall portion 86. The shutter 70, urged by the spring 80, stops against this partition 84. In addition, the shutter 70 includes a flange 88. A leaf spring 90 riveted at 92 to this flange, extends into the narrow passage between the partition 84 and the sidewall 86. This spring 90 is arranged to be pushed by a prod 94 for moving the shutter 70 to its open position shown in FIG. 7. For this purpose, the rear end of the spring 90 has an offset portion 96 and the prod 94 has bifurcations 98, as shown in FIG. 9, so that these parts will mate as shown in FIG. 8. The prod 94 is fastened to the frame 28 at 102 by welding, FIG. 8, and extends along the side of the frame 28, so that it will enter the passage between the partition 84 and sidewall 86, as the cartridge is slid into the frame 28. This action brings the mating parts 94 and 96 into engagement so that, as the cartridge slides into place, the shutter 70 is opened as indicated in FIG. 7.

The schematic circuit diagram, FIG. 11, shows the frame 28, the solenoid 39 and its plunger 38 which latches the frame both up and down, the switch 42 which is actuated when the cartridge is fully inserted in the frame 28, the switch 44 that is actuated when the frame 28 has been moved to its lower, operating position, and the solenoid 35 that controls the latch for door 30.

The solenoid 35 of the door latch is connected to the output of a DC power supply 106 through a delay device 108 and a normally closed contact 110 of a relay 112. The delay device includes a contact 114, a strip of thermally responsive bimetal 115, and a heater 116. When the power is first applied, the bimetal 115 is cold and the contact 114 is open. The current passes through the resistor 116 and the solenoid coil 35, but the resistor 116 prevents the current from being great enough to actuate the door latch solenoid 35. However, the current heats the resistor 116 and the bimetal 115, and in approximately 10 seconds the bimetal deflects to close the contact 114 and shunt the resistor 116, thereby permitting full current to flow for actuating the door latch solenoid 35 and unlatching the door 30. The current, then passing through the bimetal 115, heats the bimetal sufficiently to hold the contact 114 closed, so that the coil 35 of the solenoid is fully energized continuously.

The coil of the solenoid 39 which latches the frame 28 is connected through the switch 42 and the contact 110 to the DC power supply 106. Thus, while the contact 110 is closed and a cartridge is fully inserted in the frame 28 for actuating the switch 42, the solenoid 39 will be energized for retracting the plunger 38 and unlatching the frame 28, FIGS. 5 and 6, so that it is free to be lowered or raised.

A coil 118 of the relay 112 is connected to the DC power supply 106 through the switch 44, and also through a normally closed, "stop," pushbutton switch 120 and a normally opened, "start," pushbutton switch 122. The start switch 122 is shunted by a normally opened holding contact 124 of the relay 112. An additional normally opened contact 126 of relay 112 controls the application of AC power to the drive motor 54 which drives the spindle 48, FIGS. 3 and 4.

The operation of the system is as follows: Assume that the equipment is shut down, that there is no cartridge in the frame 28, FIG. 1, that the frame 28 is latched in its upper position, as in FIGS. 3 and 5, that the door 30 is closed and latched, and that no electric power is being applied to the system. In this condition, the relay 112, FIG. 11, will be deenergized and its contact 110 will be closed. When power is first turned on, the relay 112 will remain deenergized because its circuit is open at the switch 44 and also at the start switch 122 and holding contact 124. Current, however, will be applied through the normally closed contact 110 of the relay and through the delay device 108 and door latch solenoid 135, so that after a delay of about 10 seconds, the solenoid 35 will be actuated to unlatch the door 30. The door 30 may be opened manually and a cartridge 10 inserted as shown in FIG. 3. As the cartridge is pushed in prod 94, FIGS. 3, 8 and 11, will open the shutter 70. When the cartridge is fully inserted, it will actuate switch 42, FIGS. 3, 4 and 11, for completing the circuit through the solenoid 39 of the latch for the frame 28, FIG. 5, thereby unlatching the frame 28. Manual closing of the door 30 now lowers the frame 28 to the position shown in FIG. 4 for placing the disc 14 in operating position with respect to the spindle 48 and transducer 56. In this condition of the apparatus, the latch solenoid 39 is still energized so that the frame 28 is not latched in its lower position, and if the operator wishes he may open the door 30 to lift the frame 28 and make the cartridge accessible for removal. However, with the frame 28 in its lower position, FIG. 4, and switch 44 actuated, the start button 122, FIG. 11, may be pressed to close the circuit to the relay coil 118. This energization of coil 118 operates the contacts 110, 124 and 126. The closure of the contact 24 shunts the starting switch 122 to maintain the relay coil 118 energized after the operator removes his finger from the start button and lets the switch 122 open. The opening of the contact 110 deenergizes both the solenoids 35 and 39 to latch the door 30 closed, and also to latch the frame 28 in its lower position. The closing of the contact 126 energizes the drive motor 24 to turn the spindle 48 and the disc 14. They system is now operating and may be used in a known manner for recording and reading information on the disc 14.

The stop button 120 may be pressed. This action opens the circuit to relay coil 118, so that the contacts 110, 124 and 126 return to normal position. With the start button 122 open and also the relay contact 124 open, the stop button 120 may be released by the operator to permit it to close, and the coil 118 will remain deenergized. The opening of the contact 126 deenergizes the motor 54 so that the motor, the spindle 48 and the disc 14 begin coasting to a stop. The closing of the contact 110 of the relay 112 reenergizes the solenoid 39 through the switch 42 for unlatching the frame 28. The reclosing of the contact 110 also reenergizes the circuit through the delay device 108 and the solenoid coil 35 of the door latch. As previously described, the delay device requires about 10 seconds to heat up and close the contact 114 to provide full energization to the coil 35 for unlatching the door 30. This 10-second delay is sufficient to let the motor and the disc 14 come to a stop. With the door 30 unlatched, the operator may manually open it. This action, by means of the rollers 32, lifts the frame 28 to the raised position shown in FIG. 3. With the cartridge still in place, the switch 42 is still closed so that the coil 39 is energized, the latch plunger 38 is withdrawn, and the frame 28 is unlocked. Accordingly, at this point the operator can reclose the door 30 for resetting this same disc 14 or, alternatively, he can leave the door open and withdraw the cartridge 10 from the frame 28. This action of withdrawal opens the switch 42 to deenergize the coil 39 and latch the frame 28 in its upper position. A different cartridge may be inserted for operation as above-described. Alternatively, the frame 28 may be left empty and the door 30 manually reclosed. This reclosure will not latch the door 30 because the coil of the door latch solenoid 35 remains energized and accordingly the door may again be opened for the insertion of a cartridge.

It will be apparent that the present invention is capable of modifications and variations within the scope of the appended claims;

I claim:

1. A data storage system comprising:
- a probe;
- a magnetic memory disc;
- a housing for said disc having a surface facing inwardly thereof, said housing being provided with a first opening;
- a shutter for said first opening slidably disposed adjacent said surface;
- a resilient strip attached to said shutter having an end slidable along said surface and biased against said surface for guidance thereby;
- said housing being provided with a second opening in alignment with said end of said resilient strip for receiving said probe;
- said probe engaging said end of said strip and moving said shutter when received in said second opening;
- a power drive spindle for engaging, supporting, and driving said disc, said spindle being insertable through said first opening for supporting driving engagement with said disc;
- said housing fitting about said disc sufficiently loose wherein said spindle supports and rotates said disc in said housing free of all contact therewith when said spindle is inserted through said first opening.

2. The combination of claim 1 wherein said housing has a two-part double wall which provides said first opening, and wherein said shutter is slidably disposed between said two parts of said double wall.

3. The combination of claim 1 wherein said disc includes a ferromagnetic portion and wherein said spindle includes a magnet, said ferromagnetic portion being attracted and held by said magnet on said spindle.

4. In a magnetic disc, data storage system utilizing storage cartridges each comprising a disc housing and a magnetic memory disc contained within said housing the combination comprising:
- rotative power means for rotating said disc;
- first means for slidably releasably receiving said housing;
- second means for moving said first means between a first position and a second position, said first position enabling slidable releasable reception of said housing, said second position engaging said disc with said rotative power means;
- third means for normally maintaining said first means in said first position, said third means being responsive to the reception of said housing fully into said first means for permitting said second means to move said first means to said second position;
- fourth means responsive to the placement of said first means in said second position for maintaining said first means in said second position, said fourth means including means for conditioning the application of energizing power to said rotative power means in response to the placement of said first means in said second position;
- fifth means for selectively applying energizing power to said motive power source subsequent to response by said fourth means, said fifth means including sixth means for causing said third means to maintain said first means in said second position; and
- seventh means for selectively removing energizing power from said motive power source, said seventh means including means for effecting the normal function of said third means.